United States Patent [19]

Sochaczevski

[11] 4,334,190

[45] Jun. 8, 1982

[54] ELECTRONIC SPEED MEASURING DEVICE PARTICULARLY USEFUL AS A JOGGING COMPUTER

[76] Inventor: Aviezer Sochaczevski, 5723 Palmer Ave., Montreal, Canada

[21] Appl. No.: 174,672

[22] Filed: Aug. 1, 1980

[51] Int. Cl.³ .................... G01P 3/48; G01P 3/54
[52] U.S. Cl. .................... 324/171; 324/166; 364/565
[58] Field of Search .......... 324/171, 168, 166; 364/565; 340/670

[56] References Cited

U.S. PATENT DOCUMENTS

| | | | |
|---|---|---|---|
| 3,614,617 | 10/1971 | Blake, Jr. | 324/171 X |
| 3,683,159 | 8/1972 | Welch et al. | 324/171 X |
| 3,865,305 | 2/1975 | Sampey | 324/171 X |
| 4,007,419 | 2/1977 | Jasmine | 324/166 |
| 4,083,052 | 4/1978 | Metcalf | 324/171 X |
| 4,151,466 | 4/1979 | Boyer et al. | 324/166 |

Primary Examiner—Stanley T. Krawczewicz
Attorney, Agent, or Firm—Benjamin J. Barish

[57] ABSTRACT

An electronic device particularly useful as a jogging computer comprises presetting means for presetting the size of the user's step, an inertia sensor sensing each step, a central clock, and a microprocessor computing the user's speed and distance travelled, and displaying same on an electronic display. The described device further includes a pacer which produces a tone at a preselected rate to aid the jogger in pacing himself. A second embodiment of the invention is described for attachment to a bicycle for measuring speed and distance travelled of the bicycle.

14 Claims, 4 Drawing Figures

ELECTRONIC SPEED MEASURING DEVICE PARTICULARLY USEFUL AS A JOGGING COMPUTER

BACKGROUND OF THE INVENTION

The invention relates to an electronic speed measuring device, and particularly to a portable, low-cost, highly-accurate device which can be conveniently carried by the object whose speed is being measured. The invention is especially useful as a jogging computer and is therefore described below with respect to this application, but it could also be used for other applications as will also be described below.

Mechanical type jogging computers are known in which the user first presets the device according to his step size, and later when jogging, the computer senses each step by a mechanical type sensor and computes the distance travelled. However, this known type of jogging computer is quite imprecise in its computations of distance. Moreover, it does not compute speed or peform other functions which would be helpful to a jogger.

SUMMARY OF THE INVENTION

An object of the present invention is to provide an electronic speed measuring device which is particularly useful as a jogging computer, provides very accurate measurements, and is capable of performing a number of other functions. One particularly important function capable of being performed by the electronic device of the present invention is a pacer function, in which the device emits periodic tones at a preselected rate to aid the jogger in pacing himself.

According to a broad aspect of the present invention, there is provided an electronic device for measuring distance traversed by a body in motion per unit time comprising a housing including presetting means for presetting a distance constant corresponding to the distance per increment of the motion, and a sensor sensing these increments of motion and outputting a sensor signal for each. The device further includes an electronic display, and an electronic data processor having a central clock measuring time in a real-time manner, means for storing the preset distance constant, means for computing the time interval between successive sensor signals, means for multiplying the latter time interval by the stored distance constant to produce a measurement of speed, and means for feeding the latter measurement to the electronic display.

In the preferred embodiment of the invention described below, the electronic data processor further includes means for multiplying the total number of sensor signals by the inputted distance constant to produce a measurement of distance travelled, and for displaying that latter measurement in the electronic display.

According to a further important feature of the invention, the presetting means also includes means for presetting pacer-rate constant corresponding to a predetermined number of increments of motion per unit time. A tone generator carried by the housing is actuated to sound an audible tone for each of the predetermined number of increments of motion per unit time, and thereby to pace the user.

One described embodiment is a jogging computer, wherein the distance-presetting means is used for presetting information corresponding to the size of the user's step when jogging. This embodiment may include a clip for attachment to his wrist. A second embodiment of the invention is described wherein the information to be preset corresponds to the diameter of the wheel in a wheeled vehicle, such as a bicycle, whereby the device may be used as a vehicle speedometer.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

General Construction

Figure 1:
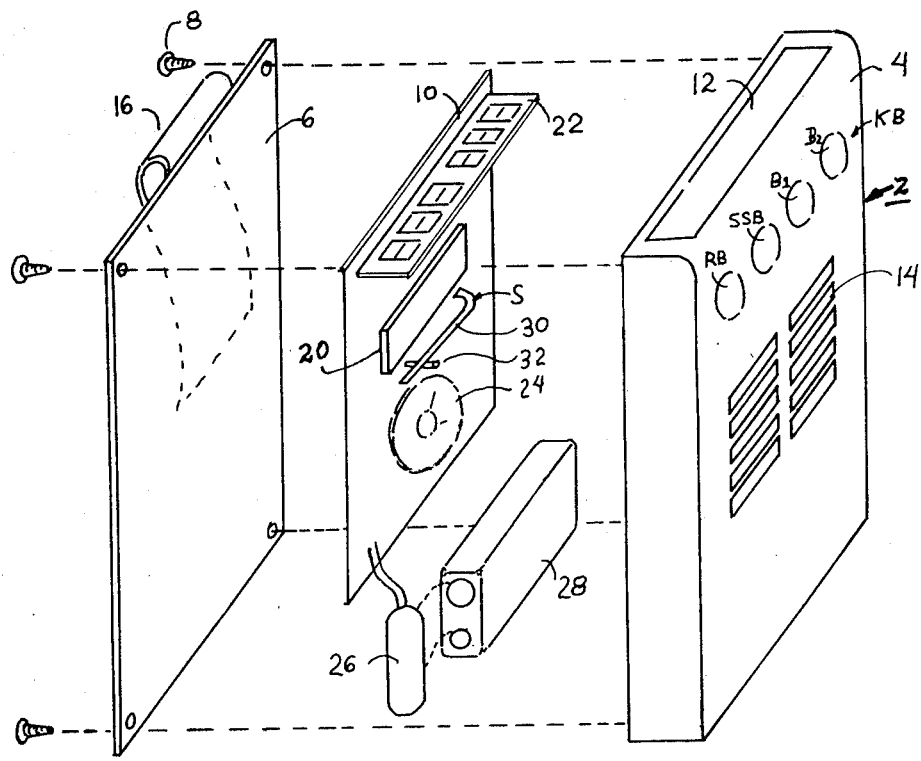
FIG. 1 is a three-dimensional exploded view illustrating a jogging computer constructed in accordance with the present invention.

FIG. 1 illustrates a jogging computer of small compact size adapted to be conveniently carried by the user to measure and display his jogging speed and also the total distance travelled over any preselected time interval. The illustrated device can also be used as a pacer for emitting a tone signal or "beep" at preselectable rates to aid the jogger in pacing himself. Further, the illustrated device can be used also as a stop watch to time the jogger, and as a delay alarm to sound a signal after a preselected time or distance The device illustrated in FIG. 1 comprises a housing generally designated 2, constituted of a front section 4 closed by a back panel 6, e.g. by the use of fasteners 8 or by a snap fit such as in pocket-size transistor radios, calculators, hand-held electronic games, and the like. A printed circuit board 10 carrying the electronic elements of the device, as will be described more particularly below, is enclosed within the housing, these elements being made accessible by removing the back panel 6.

The front housing section 4 is formed with an elongated window 12 extending across its top wall, and with a keyboard of four push-buttons supported on its front wall. These four push-buttons include Reset button RB, Start/Stop button SSB, and two Data buttons $B_1$ and $B_2$ for presetting information into the device. The front housing section 4 is further formed with a plurality of openings 14 serving as a grill for a speaker disposed within the housing. The back panel 6 includes a belt-clip 16 for attachment to the belt of the user.

The printed circuit board 10 within the housing carries all the electronic components, including a microprocessor 20 and an electronic display 22, which may be the LCD (Liquid-Crystal-Device) or the LED (Light-Emitting-Diode) type. The electronic display 22 is secured to the upper end of the printed circuit board 10 at right angles thereto so as to align itself with window 12 of the front housing section 4 when the device is assembled.

A speaker 24 is carried at the lower end of the printed circuit board and is aligned with the speaker grill 14 of the front housing section when the device is assembled. The lower end of the printed circuit board 10 also includes a battery connector 26 for connection to a battery 28 to be disposed in a suitable compartment provided in the front housing section.

Printed circuit board 10 further carries a sensor S for sensing the increments of motion and for outputting a sensor signal for each increment. When the device is used as a jogger computer, these increments of motion would be the steps of the jogger. Sensor S is of the inertia type and comprises a cantilever-mounted leaf spring 30 normally biassed out of engagement with a fixed stop 32, but displaceable to engage same by inertia with each step of the jogger. Both the leaf spring 30 and the stop 32 are of metal, and come into contact to complete an electrical circuit with each step made by the jogger. Each completion of the electrical circuit thus produces a sensor signal which is fed to the microprocessor 20 for processing in the manner to be described below.

The jogging computer illustrated in FIG. 1 can perform the following functions:
1. compute and display jogging speed,
2. compute and display distance travelled;
3. display running time (stop-watch),
4. sound a pacing buzzer per a set frequency,
5. sound a pacing buzzer per a calculated frequency, and
6. sound a delay alarm per a preset time or distance Each of these functions will be described more particularly below.

Functional Logic

Figure 2:
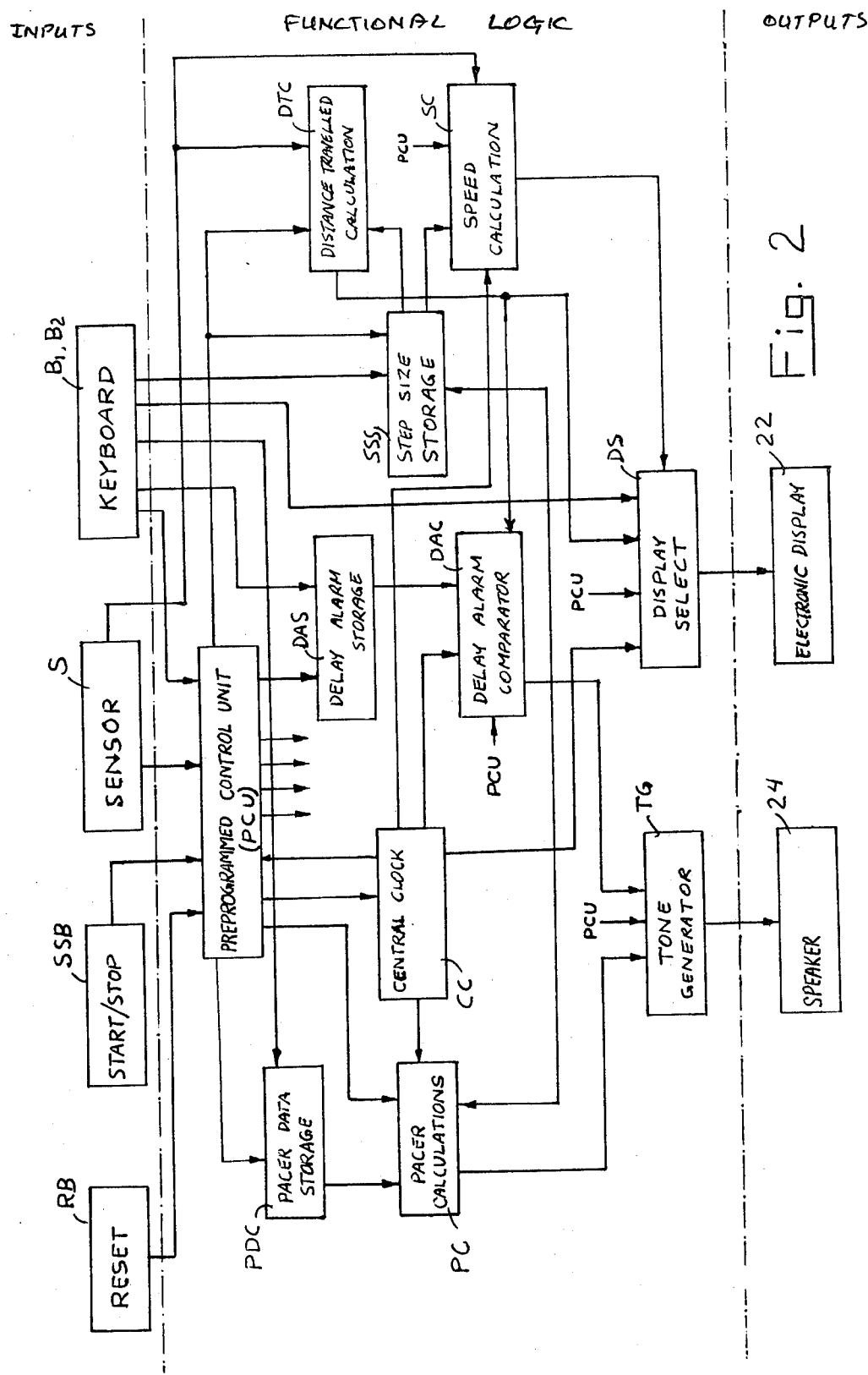
FIG. 2 is a block diagram schematically illustrating the electronic logic of the microprocessor in the jogging computer of FIG. 1.

FIG. 2 is a block diagram schematically illustrating the functional logic of the microprocessor 20 in the device of FIG. 1, including its inputs and outputs. Thus, its inputs include the Reset button RB, the Start/Stop button SSB, the Data buttons $B_1$, $B_2$, and the inertia sensor S sensing each step made by the jogger. The outputs of microprocessor 20 include the electronic display 22 and the speaker 24.

The functional logic of microprocessor 20, as illustrated in FIG. 2, includes a Preprogrammed Control Unit PCU which receives its inputs from the Reset button RB, the Start/Stop button SSB, the Data buttons $B_1$, $B_2$ and the sensor S. Information inputted by the Data buttons $B_1$, $B_2$ may also be selectively fed to a Step Size Storage circuitry SSC, a Pacer Data Storage circuitry PDC, a Delay Alarm Storage circuitry DAS, or a Display Select circuitry DS, all as selectively controlled by the Preprogrammed Control Unit PCU.

Circuitry SSC stores the preset size (inputted in the Metric system or English system as described below) of the user's step while jogging.

Circuitry PDS stores the preset information which determines the frequency of the "beeps" to be sounded by the speaker 24. The user has two options for inputting this information. That is, he may input either (1) a predetermined number of beeps per minute, or (2) the total distance of a "run" and the total time to traverse same, in which case the device will calculate the appropriate number of beeps per minute.

Circuitry DAS stores the time period after depressing the Start/Stop button SSB that an alarm will be actuated.

Microprocessor 20 further includes a central clock CC which measures time in a real-time manner and controls thereby various calculations and operations, as will be described more particularly below.

The circuitry included within microprocessor 20 for performing calculating functions includes Speed Calculation circuitry SC receiving information from the Step Size Storage circuitry SSS and controlled by the Central Clock CC, the Sensor S, and the Preprogrammed Control Unit PCU. Distance travelled calculations are performed by circuitry DTC which also receives information from the Step Size Storage circuitry SSS and is controlled by the Sensor S and the Preprogrammed Control Unit PCU. Pacer calculations are performed by circuitry PC which receives information from the Pacer Data Storage circuitry PDC and the Step Size Storage circuitry SSS, and is controlled by the Central Clock CC and the Preprogrammed Control Unit PCU.

Microprocessor 20 further includes Delay Alarm Comparator circuitry DAC which receives information from the Delay Alarm Storage circuitry DAS and is controlled by the Central Clock CC and the Preprogrammed Control Unit PCU.

Finally, the microprocessor 20 includes Tone Generator circuitry TG and Display Select circuitry DS. The Tone Generator circuitry TG drives the speaker 24 according to a predetermined pace, either preselected or calculated in Pacer Calculations circuitry PC as controlled by the Preprogrammed Control Unit PCU, or according to the delay alarm data stored in DAS which is compared with the time registered in Central Clock CC via the Delay Alarm Comparator DAC. The Display Select circuitry DS selectively feeds the electronic display 22 with the information from the Data buttons $B_1$, $B_2$, the Distance Travelled Calculations circuitry DTC, or the Speed Calculation circuitry SC, as controlled by the Central Clock CC and the Preprogrammed Control Unit PCU.

Presetting

The device illustrated in FIGS. 1 and 2 is preset according to the step size, the measuring system (Metric or English), the desired pacer rate of beeps per minute or the data (running distance and running time) from which the pacer rate is to be calculated, and the delay alarm This is done in the following manner:

First, Reset key RB is depressed, resetting the circuitries within the microprocessor, at which time the display 22 will show "000 000. " Preferably, the microprocessor is programmed so that only the measurements made by the device are reset, and not the originally preset information, which latter information is reset only if, where, and when needed, in the same manner as it is preset in the setting cycle.

To start the setting cycle, Data button $B_2$ is depressed at which time the display will show "100 000," indicating that the device is ready for the first setting data.

The first setting data is the step size of the jogger using the device. His step size is preset in the form of a two-digit figure. First, he depresses Data button $B_2$, whereupon the extreme right digit of the electronic display 22 starts to slowly count-up. When the correct figure corresponding to the rightmost digit of his step size appears, the user releases Data button $B_2$, and depresses Data button $B_1$ to register that figure in the Step Size Storage circuitry SSS. The next digit of the jogger's step size is set in the same manner and when Data button $B_1$ is depressed for registering this second digit, the display 22 shows "200 000," and the device is now ready for the second setting.

The second setting relates to the measuring system desired, i.e. Metric or English. To effect this setting, Data button $B_2$ is depressed, whereupon the rightmost digit of display 22 will alternately show "1" indicating the metric system, and "2" indicating the English system. Button $B_2$ is released when the desired system is shown, and then button $B_1$ is depressed to enter this into the Step Size Storage circuitry SSS. Display 22 will now show "300 000."

The third setting concerns the selected pacer rate, namely the rate that the Tone Generator TG will be actuated to drive speaker 24 to produce audible sounds or "beeps." The selected number of "beeps" per minute is preset in three digits, each as in the step size operation. That is, for each digit of the selected rate, Data button $B_2$ is despressed until that digit is shown in the display 22, and then Data buttons $B_1$ is depressed for registering that digit in the Pacer Data Storage circuitry PDC. When the third digit of the pacer rate has thus been stored by depressing Data button $B_1$, the device is switched to the fourth setting, and the display now shows "400 000."

The fourth setting is used for presetting the device according to the second pacer option, namely the beeps per second required to traverse a specified total distance in a specified total time. Each digit of the total distance is set in the same manner as in the first setting, by first depressing the Data button $B_2$ until the appropriate number appears in the display, and then registering that number in the Pacer Data Storage circuitry PDC by depressing button $B_1$. If the second setting selected the Metric system, the inputted distance would be in meters, and if it selected the English system, the inputted distance would be in yards. Five digits are allotted for the total distance. After the fifth digit has been set, pressing button $B_1$ clears the display, except for the extreme right digit which will still show "4" The device is now ready for setting the seconds in three digits, which is done in the same manner. When that setting is completed and button $B_1$ is depressed, the display shows "500 000," and the device is now ready for the fifth setting.

Only one pacer option may be used, i.e. that of the third or fourth setting. If that of the third setting is desired, the fourth setting is preset to "0," and if that of the fourth setting is desired, the third setting is preset to "0." If neither pacer option is desired (i.e. no pacer function), both settings are set to "0."

The fifth setting concerns the delay alarm, and selects the specific time in hours, minutes and seconds that the alarm is to be sounded. The actual setting is made by the use of the Data keys $B_1$ and $B_2$ in the same manner as described with respect to the first setting, the first two digits from the right indicating seconds, the next two digits indicating minutes, and the fifth digit indicating hours. The second and fourth digits only run from "0" to "5." This information is stored in the Delay Alarm Storage circuitry DAS.

After the fifth setting has been completed, the display 22 returns to its normal setting, i.e. it simultaneously displays speed in the three right digits, and distance in the three left digits.

Operations

Once the above setting have been made, the Start/Stop button SSB may be depressed whenever it is desired to start the measuring operations during jogging, whereupon the sensor S senses each jogger step and the Central Clock CC measures time in a real timer manner. By depressing button $B_1$, the display is switched to alternate between a Speed/Distance Mode displaying the speed in the three right digits and the distance in the three left digits, and a Stop Watch Mode displaying the actual running time.

When operating in the Speed/Distance Mode, the device measures the speed of the jogger by multiplying the step size as preset in the Step Size Storage circuitry SSS, by the time interval between steps, i.e. between two successive input signals from the sensor S. The device measures the distance travelled by multiplying the step size from the Step Size Storage circuitry SSS by the total number of steps, i.e. the total number of signals received from the sensor S.

Actually, the speed is continuously computed and displayed as a weighted average, rather than as an instantaneous value. For example, the speed is continuously computed by multiplying the previous speed computation by a first predetermined weighted number "n" (e.g. "9"), adding the instantaneous speed for the respective step multiplied by another weighted number "M" (e.g. "1"), and then dividing the result by "n+m" (i.e. "10"). Thus, each step will have only a 10%, rather than a 100%, influence on the speed computation displayed by the device at any instant. This prevents rapid fluctuations in the speed read-out caused by slight variations in the instantaneous speed of the jogger during each step. It will be appreciated that the microprocessor, particularly its pre-programmed control unit circuitry PCU, can be programmed in known manners to produce the above weighted average speed computation, or an instantaneous speed, as may be desired.

The stop-watch function is performed by the Control Clock CC which reads out to the display 22 the time in hours, minutes, seconds and 1/10 seconds whenever Data button $B_1$ is depressed which, as described above, causes the running time to be displayed alternately with the speed/distance.

If the device is to be used only in the Stop-Watch Mode, Reset button RB may be depressed, and then button $B_1$ (rather than button $B_2$) may be depressed, whereupon the above described setting functions are by-passed. The device first displays "000 000" and thereafter operates as a stop-watch displaying the running time, until the Start/Stop button SSB is again depressed.

The function of energizing the pacing buzzer is performed by the Tone Generator circuitry TG which drives the speaker 24 in accordance with either the present rate, or the required rate for a preset distance and running time as stored in the pacer Storage Circuitry PDC and processed by the Pacer Calculations circuitry PC. In the latter case, the Pacer Calculations circuitry calculates its own rate by dividing the distance to be run by the total number of seconds in which it is to be run, and then dividing this by the step size, to produce the appropriate beep rate.

The delay alarm function involves the sounding of a delay alarm at a preset time. This function is performed by the Delay Alarm Comparator circuits DAC which compares the preset time stored in the Delay Alarm Storage circuitry DAS with the Central Clock CC, to actuate the Tone Generator TG (e.g., continuously for five seconds) when the preset time has arrived.

The device may also be programmed to sound the delay alarm after a preset distance has been traversed. In this case, the Delay Alarm Comparator circuit DAC would compare the preset distance stored in the Delay Alarm Storage circuitry DAS with the information in the Distance Travelled Calculations circuitry DTC to actuate the Tone Generator TG (e.g. continuously for five seconds) when the preset distance has been traversed.

It will be appreciated that commercially-available microprocessors such as are known and used for example in the electronic hand-held games, may be programmed according to known techniques to perform all of the above functions. For example, one micro-processor that may be used is TMS 1100, C-MOS version available from Texas Instruments Corp., whose construction, operation, and method of programming are described in the book titled "Programmer's Reference manual TMS 1000 Series MOS/LSI, One-Chip Microcomputer," Copyright 1975 by Texas Instruments Corporation.

Figures 3, 4:
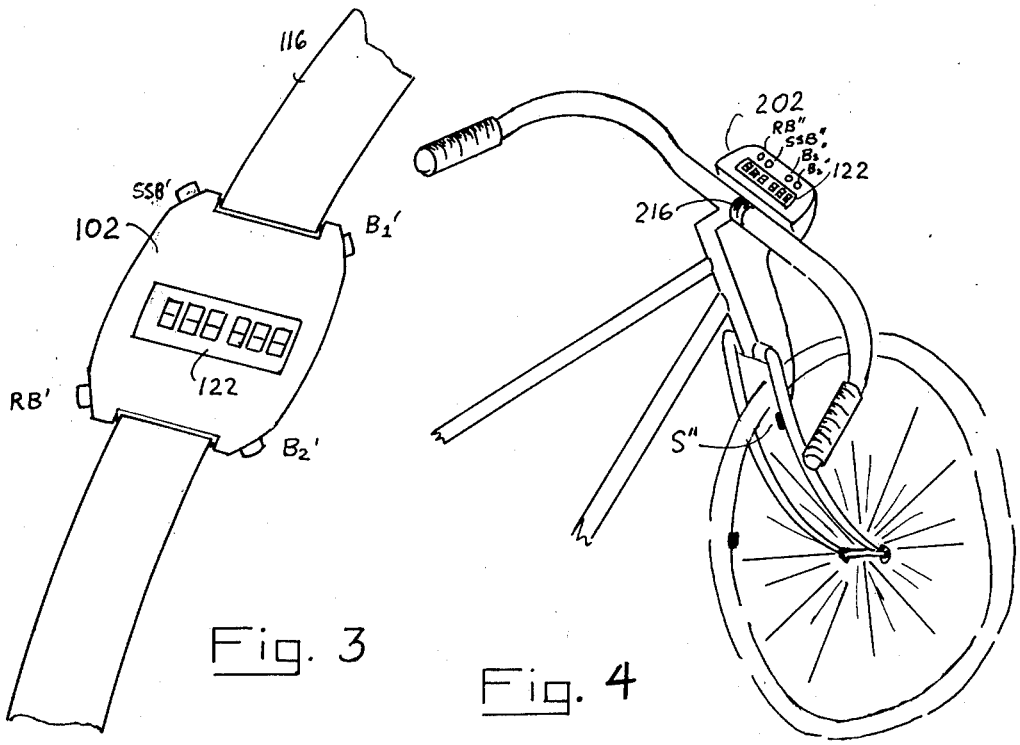
FIG. 3 illustrates the jogging computer of FIG. 1 attachable to the user by means of a wrist-band.
FIG. 4 illustrates a bicycle speedometer constructed in accordance with the present invention.

FIG. 3 illustrates a modification of the invention of FIGS. 1 and 2, wherein the housing, therein designated 102, is secured to a wrist band 116 for attachment to the user's wrist, thereby simultaneously digital electronic wrist watch. In such an arrangement, the electronic display, therein designated 122, would occupy the front wall of the housing 102. In addition, the four push-buttons for presetting the information and controlling the modes of operation, would preferably occupy the four corners of the housing, as indicated by Reset button RB', Start/Stop button SSB' and Data buttons $B_1'$, $B_2'$. The structure and operation of the device illustrated in FIG. 3 would otherwise be the same as described above with respect to FIGS. 1 and 2.

FIG. 4 illustrates the device embodied as a speedometer and mileage indicator for a wheeled vehicle, namely a bicycle. For this purpose, the housing, therein designated 202, would be attached in any suitable manner to the bicycle, as by the use of a clamp 216 securing same to the bicycle handle bars. In addition, the sensor in this case would sense each revolution of the bicycle wheel, rather than each step of the jogger, and therefore the information preset into the Step Size Storage circuitry SSS would correspond to the circumference (or diameter) of the bicycle wheel. The sensor, therein designated S", could be any known sensor for sensing each rotation of the wheel, for example a probe of the electromagnetic or capacitance type fixed to the frame and adapted to sense a magnetic or electrically-conductive element carried by the bicycle wheel during each rotation of the wheel. When the device is embodied as a speedometer for a bicycle, the display unit 122 would preferably occupy the front or upper wall of the housing, and the push button, namely Reset button RB", Sart/Stop button SSB" and the Data buttons $B_1''$ and $B_2''$, would preferably be disposed above the display unit 122.

While the invention has been described with respect to several preferred embodiments, it will be appreciated that many other variations, modifications and applications of the invention may be made.

What is claimed is:

1. An electronic device for measuring distance traversed by a body in motion per unit time, comprising:
   A. a housing;
   B. presetting means carried by said housing for presetting a distance constant corresponding to the distance per increment of the motion;
   C. a sensor carried by said housing for sensing each increment of motion and outputting a sensor signal therefor;
   D. an electronic display carried by said housing; and
   E. an electronic data processor disposed within said housing and including:
      (1) a central clock measuring time in a real-time manner,
      (2) means for storing said preset distance constant,
      (3) means including said central clock for computing the time intervals between successive sensor signals,
      (4) means for computing measurements of speed by multiplying said latter time intervals by the stored distance constant
      (5) and means for feeding said measurements of speed to said electronic display.

2. An electronic device according to claim 1, wherein said means for computing measurements of speed computes same as a weighted average over a predetermined number of increments of motion, by each previously-computed speed by a weighted number "n," adding the instantaneous speed multiplied by another weighted number "m," and then dividing by "n+m."

3. An electronic device according to claim 1, wherein said presetting means further includes means for presetting a pacer rate constant corresponding to a predetermined number of said increments of motion per unit time, said electronic data processor further including means for storing said pacer rate constant, a tone generator, and means for actuating said tone generator by the stored pacer-rate constant to cause same to sound an audible tone for each of said predetermined number of increments of motion per unit time.

4. An electronic device according to claim 1, wherein said electronic data processor further includes means for multiplying the total number of sensor signals by the stored distance constant to produce a measurement of total distance traversed, and for feeding said latter measurement to said electronic display.

5. An electronic device according to claim 1, wherein said sensor is a mechanical inertia device including a mechanical element which is displaced by inertia for each of said increments of motion to output said sensor signal.

6. An electronic device according to claim 5, wherein said inertia device includes a cantilever-mounted metal leaf biased out of engagement with a fixed metal contact and displaced thereagainst by inertia for each of said increments of motion.

7. An electronic device according to claim 1, wherein said presetting means for presetting the distance constant presets information corresponding to the user's step size when jogging, whereby the device may be used as a jogging computer.

8. An electronic device according to claim 7, wherein said housing carries a clip for attaching same to the user.

9. An electronic device according to claim 7, wherein said housing is carried by a wrist-band for attaching same to the user.

10. An electronic device according to claim 1, wherein said presetting means for presetting the distance constant presets information corresponding to the diameter of a wheel in a wheeled vehicle, whereby the device may be used as a speedometer for the wheeled vehicle.

11. An electronic device according to claim 10, wherein the wheeled vehicle is a bicycle, and said housing includes a clip for clipping same to the bicycle.

12. An electronic device according to claim 1, wherein said presetting means further includes means for presetting a specified time-delay, said electronic data processor further including means for storing said time-delay, a tone generator, and means for comparing the stored time-delay with the central clock and for actuating said tone generator when the time of the central clock corresponds to the stored time-delay.

13. An electronic device according to claim 1, wherein said presetting means includes a keyboard comprising a plurality of buttons, said keyboard further including a Start/Stop button which starts and stops all measuring functions, and a Reset button which resets the device.

14. An electronic device according to claim 1, wherein said electronic data processor is a microprocessor including a preprogrammed control unit.

* * * * *